(12) United States Patent
Salminen

(10) Patent No.: US 11,483,426 B2
(45) Date of Patent: Oct. 25, 2022

(54) APPARATUS AND METHOD FOR MANAGING EVENT NOTIFICATIONS IN MOBILE DEVICES AND COMPUTER PROGRAM PRODUCT THEREFOR

(71) Applicant: HUAWEI TECHNOLOGIES CO., LTD., Shenzhen (CN)

(72) Inventor: Karoliina Taru Katriina Salminen, Helsinki (FI)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 102 days.

(21) Appl. No.: 17/008,908

(22) Filed: Sep. 1, 2020

(65) Prior Publication Data
US 2020/0396328 A1 Dec. 17, 2020

Related U.S. Application Data

(63) Continuation of application No. PCT/EP2018/074383, filed on Sep. 11, 2018.

(51) Int. Cl.
*H04W 68/00* (2009.01)
*H04M 1/72454* (2021.01)
*G06N 20/00* (2019.01)
*G06N 5/04* (2006.01)
(Continued)

(52) U.S. Cl.
CPC .......... *H04M 1/72454* (2021.01); *G06N 5/04* (2013.01); *G06N 20/00* (2019.01); *H04M 1/72457* (2021.01); *H04W 4/20* (2013.01); *H04M 2250/10* (2013.01); *H04M 2250/12* (2013.01)

(58) Field of Classification Search
CPC ......... H04M 1/72454; H04M 1/72457; H04M 4/20; H04M 2250/10; H04M 2250/12; H04M 1/724; H04M 1/72448; H04M 15/84; H04M 2215/81; H04M 2215/815; H04M 68/00; G06N 5/04; G06N 20/00; G06F 9/542
See application file for complete search history.

(56) References Cited

U.S. PATENT DOCUMENTS 10,136,296 B1 * 11/2018 Dames .................... H04L 67/12
10,306,421 B2 *  5/2019 Xu ......................... G08C 17/02
10,887,266 B2 *  1/2021 Vardhan ................ H04L 51/214
(Continued)

FOREIGN PATENT DOCUMENTS

WO        2016090421 A1     6/2016

*Primary Examiner* — Andrew Wendell
(74) *Attorney, Agent, or Firm* — Rimon PC

(57) ABSTRACT

The present disclosure relates to apparatus and method that improves the efficiency of filtering event notifications prior to displaying them in mobile devices. After an event notification relating to a new event occurred in the mobile device is obtained, the notification context associated with the user of the mobile device and/or the mobile device for the event notification is first determined. After that, a relevance degree for the event notification is predicted based on the event notification and the notification context by using a learning algorithm that takes into account past event notifications, associated past notification contexts and user reactions to the past event notifications. It is eventually decided whether to display the event notification to the user of the mobile device based on the predicted relevance degree.

20 Claims, 9 Drawing Sheets

(51) Int. Cl.
  *H04W 4/20* (2018.01)
  *H04M 1/72457* (2021.01)

(56) References Cited

U.S. PATENT DOCUMENTS

| | | | |
|---|---|---|---|
| 11,153,109 B2 * | 10/2021 | Kwatra | H04L 12/1818 |
| 11,341,535 B1 * | 5/2022 | Wang | G06Q 30/0246 |
| 2016/0249319 A1 * | 8/2016 | Dotan-Cohen | H04M 1/72454 |
| 2016/0282156 A1 | 9/2016 | Ott et al. | |
| 2018/0013844 A1 | 1/2018 | Foged et al. | |
| 2019/0166457 A1 * | 5/2019 | Lipowski | H04W 4/022 |
| 2019/0235936 A1 * | 8/2019 | Murdock | G06F 9/542 |
| 2020/0012423 A1 * | 1/2020 | Cinek | H04M 19/042 |
| 2020/0387277 A1 * | 12/2020 | Tokuchi | H04L 51/42 |

\* cited by examiner

APPARATUS AND METHOD FOR MANAGING EVENT NOTIFICATIONS IN MOBILE DEVICES AND COMPUTER PROGRAM PRODUCT THEREFOR

CROSS-REFERENCE TO RELATED APPLICATIONS

This application is a continuation of International Application No. PCT/EP2018/074383, filed on Sep. 11, 2018. The disclosures of the aforementioned application are hereby incorporated by reference in its entirety.

TECHNICAL FIELD

The present disclosure relates to the field of data processing in general, and to techniques for managing event notifications in mobile devices based on artificial intelligence in particular.

BACKGROUND

Various mobile applications are prevalent in almost all modern mobile devices, such as mobile, cellular phones, smartphones, etc. Some of the mobile applications, like Twitter, Facebook, WhatsApp, Viber and email clients, allow a user of a mobile device to receive notifications on various events, such as incoming/missed calls, message reception, requests for friendships form other users of different social networks, changes in account profiles of available friends in the social networks, etc. Typically, the mobile device displays such notifications in a notification list, so that the user is able to see all of them immediately or later.

However, one common problem occurs when some of the mobile applications installed on a mobile device react to the same event (for example, built-in and additionally installed weather applications notify about the same ambient temperature change), thus producing more than one notification on the same event. As a result, the notification list of the mobile terminal contains identical notifications.

Another common problem occurs when a user is a 'heavy user' of the mobile device who uses many mobile applications. For example, such heavy user may have several email accounts (work, private, hobby related, other activity related accounts), and each email account may be configured to send a notification on each received email message. The number of notifications during an active day may be huge, will flood the notification list of the mobile device. Furthermore, in the notification list of the mobile device, some notifications may be of low importance, others may be urgent, and still others may have become outdated by the time the user receives or sees the notification list or when the user has time to check the notification list.

The above-mentioned problems together with a relatively small display in the mobile device result in a long notification list consisting of multiple pages (screens) of notifications. This situation may cause frustration and annoyance in the user who might prefer to see only those notifications requiring actions, or those notifications that may be important, or those that may be relevant to a recent situation, location, event or person, hobby, for instance, based on a criterion, such as time of day.

Therefore, there is a need for a solution that mitigates or eliminates the above-mentioned drawbacks peculiar to the prior art.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an object of the present disclosure to provide a technical solution for improving the efficiency of filtering event notifications prior to displaying them in mobile devices.

The object above is achieved by the features of the independent claims in the appended claims. Further embodiments and examples are apparent from the dependent claims, the detailed description and the accompanying drawings.

According to a first aspect, a method for managing event notifications in a mobile device is provided. At first, an event notification intended for display to a user and relating to a new event occurred in the mobile device is obtained, whereupon a notification context is determined, which is associated with the user of the mobile device and/or the mobile device for the event notification. Next, a relevance degree for the event notification is predicted based on the event notification and the notification context by a learning algorithm that takes into account past event notifications, associated past notification contexts and user reactions to the past event notifications. After that, it is decided whether to display the event notification to the user of the mobile device based on the predicted relevance degree. By doing so, the event notifications that are the most relevant at this moment are displayed to the user of the mobile device in the first place, thereby providing the improved filtering of the event notifications and, consequently, saving user time and facilitating faster user actions on the event notifications.

In an implementation form of the first aspect, the notification context comprises information about user activity, user content, sensor information from at least one sensor of the mobile device, application information and/or a zone identifier indicative of a geographical zone within which the mobile device is located. This allows making said filtering more efficient by taking into account all the above-mentioned factors accompanying the reception of the event notification.

In a further implementation form of the first aspect, the geographical zone is defined based on satellite positioning system coordinates received from a location sensor used in the mobile device. This allows determining the location of the mobile device more precisely, thereby facilitating predicting the relevance degree in a more accurate manner.

In a further implementation form of the first aspect, the learning algorithm is an unsupervised machine learning algorithm. This allows making the step of predicting the relevance degree more automatic, thereby minimizing user involvement therein.

In a further implementation form of the first aspect, the learning algorithm is implemented by using a neural network, a decision tree or random indexing. This provides flexibility in use since the method according to the first aspect may be implemented by using different learning means.

In a further implementation form of the first aspect, said deciding comprises, when the predicted relevance degree exceeds a predetermined threshold, deciding to display the event notification to the user, and preventing the event notification from displaying to the user when the predicted relevance degree fails to exceed the predetermined threshold. By doing so, the user may see only the most relevant event notifications, which allows saving the user time to a greater extent.

In a further implementation form of the first aspect, the past notification context for each past event notification is pre-encoded as a sparse vector representation, and said predicting comprises: encoding the notification context of the event notification as the sparse vector representation; comparing the sparse vector representation for the event notification to the sparse vector representation for each past event notification by using a vector distance measure; based on the results of said comparing, presenting the past event notification closest to the event notification; and obtaining the predicted relevance degree for the event notification by taking into account the user reaction to the presented past event notification. This allows minimizing the memory size required to store the past event notifications and the past notification contexts and simplifying and at the same time improving said predicting the relevance degree.

In a further implementation form of the first aspect, said comparing is performed by using a random indexing algorithm. By doing so, the accuracy of said predicting of the relevance degree can be improved to a greater extent.

In a further implementation form of the first aspect, the new event is a receipt of one of the following: a message in a social network, an email message, an SMS message, an application message, an incoming call, an alarm-clock signal, and a calendar event. This additionally provides the flexibility in use since the method according to the first aspect is able to take into account different events.

According to a second aspect, an apparatus for managing event notifications in a mobile device is provided, which comprises at least one processor and a memory coupled to the at least one processor and storing processor executable instructions. Being executed by the at least one processor, the processor executable instructions cause the at least one processor to: obtain an event notification intended for display to a user and related to a new event occurred in the mobile device; determine a notification context associated with the user of the mobile device and/or the mobile device for the event notification; predict a relevance degree for the event notification based on the event notification and the notification context by using a learning algorithm that takes into account past event notifications, associated past notification contexts and user reactions to the past event notifications; and decide whether to display the event notification to the user with the mobile device based on the predicted relevance degree. By doing so, the event notifications that are the most relevant at this moment are displayed to the user of the mobile device in the first place, thereby providing the improved filtering of the event notifications and, consequently, saving user time and facilitating taking faster user actions on the event notifications.

In an implementation form of the second aspect, the notification context comprises information about user activity, user content, sensor information from at least one sensor of the mobile device, application information and/or a zone identifier, the zone identifier being indicative of a geographical zone within which the mobile device has located. This allows making said filtering more efficient by taking into account all the above-mentioned factors accompanying the reception of the event notification.

In a further implementation form of the second aspect, the geographical zone is defined based on satellite positioning system coordinates received from a location sensor used in the mobile device. This allows determining the location of the mobile device more precisely, thereby facilitating predicting the relevance degree in a more accurate manner.

In a further implementation form of the second aspect, the learning algorithm is an unsupervised machine learning algorithm. This allows making the operation of predicting the relevance degree more automatic, thereby minimizing user involvement therein.

In a further implementation form of the second aspect, the at least one processor is configured to implement the learning algorithm by using a neural network, a decision tree or random indexing. This provides flexibility in use since the apparatus according to the second aspect may be implemented by using different learning means.

In a further implementation form of the second aspect, the processor executable instructions further cause the at least one processor to, when the predicted relevance degree exceeds a predetermined threshold, decide to display the event notification to the user, and prevent the event notification from displaying to the user when the predicted relevance degree fails to exceed the predetermined threshold. By doing so, the user may see only the most relevant event notifications, which allows saving the user time to a greater extent.

In a further implementation form of the second aspect, a past notification context for each past event notification is pre-encoded as a sparse vector representation, and the processor executable instructions further cause the at least one processor to predict the relevance degree by: encoding the notification context of the event notification as the sparse vector representation; comparing the sparse vector representation for the event notification to the sparse vector representation for each past event notification by using a vector distance measure; based on the results of said comparing, presenting the past event notification closest to the event notification; and obtaining the predicted relevance degree for the event notification by taking into account the user reaction to the presented past event notification. This allows minimizing the memory size required to store the past event notifications and the past notification contexts and simplifying and at the same time improving said predicting the relevance degree.

In a further implementation form of the second aspect, the processor executable instructions further cause the at least one processor to perform said comparing by using a random indexing algorithm. By doing so, the accuracy of said predicting of the relevance degree can be improved to a greater extent.

According to a third aspect, a computer program product is provided comprising a computer-readable storage medium storing a computer program. The computer program, when executed by at least one processor, causes the at least one processor to perform the method according to the first aspect. Thus, the method according to the first aspect can be embodied in the form of the computer program, thereby additionally providing flexibility in use thereof.

Other features and advantages of the present invention will be apparent upon reading the following detailed description and reviewing the accompanying drawings.

BRIEF DESCRIPTION OF THE DRAWINGS

The essence of the present invention is explained below with reference to the accompanying drawings in which.

DETAILED DESCRIPTION

Figure 1A:
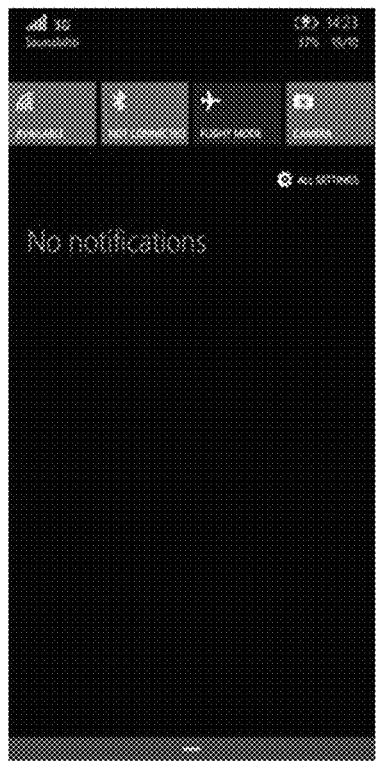
FIG. 1A-B illustrates one exemplary situation which may cause annoyance to a user.

In the following description, references are made to the accompanying drawings, which form part of the present disclosure, and in which are shown, by way of illustration, specific aspects, embodiments and examples in which the present disclosure may be placed. It is understood that other aspects may be utilized and structural or logical changes may be made without departing from the scope of the present disclosure. The following detailed description, therefore, is not to be taken in a limiting sense, as the scope of the present disclosure is defined be the appended claims. Further, the present disclosure can be embodied in many other forms and should not be construed as limited to any certain structure or function disclosed in the following description.

According to the detailed description, it will be apparent to ones skilled in the art that the scope of the present disclosure covers any embodiment of the present invention, which is disclosed herein, irrespective of whether this embodiment is implemented independently or in concert with any other embodiment of the present disclosure. For example, the apparatus and method disclosed herein can be implemented in practice by using any numbers of the embodiments provided herein. Furthermore, it should be understood that any embodiment of the present disclosure can be implemented using one or more of the elements presented in the appended claims.

As used herein, the term "mobile device", also known as "mobile terminal", refers to a portable computing device, such as a mobile phone, cellular phone, smartphone, media player, tablet computer, etc. Although the aspects and embodiments of the present disclosure are further described with regard to the mobile or cellular phone, this should not be construed as any limitation to the present disclosure, and other types of the mobile devices like those already discussed above may be similarly used depending upon particular applications. It should be also obvious to those skilled in the art that the mobile device may be provided with Internet connection functions, and in such case, respective mobile applications, for example, giving access to social networks, such as Facebook, Twitter, Instagram, etc., may be installed thereon.

As used herein, the term "notification" or "event notification" refers to a set of alpha, numeric or alphanumeric characters indicative of an event occurred in the mobile device. Preferably, the set of such characters is written as one or more rows forming an entry in a notification list displayed on the screen of the mobile device. The event itself may pertain to something that happens or takes place in the operation of the mobile device and mobile applications installed thereon, including, by way of example but not limitation: a message in a social network, an email message, an SMS message, an application message, an incoming call, an alarm-clock signal, and a calendar event.

The term "relevance degree" also used herein refers to a degree to which the user of the mobile device may be interested in reading a given event notification under current circumstances. The current circumstances are referred to herein as "notification context" and will be discussed below in more detail. The more the relevance degree of a given event notification is, the more the user is predicted to be interested in reading the event notification.

Figure 1B:
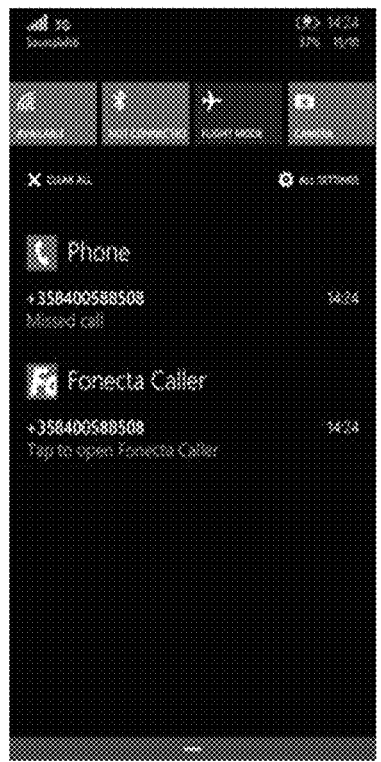

Referring to FIGS. 1A-B, one exemplary situation will be now described, in which the user of a mobile device may see two or more notifications on the same event. In particular, each of FIGS. 1A-B represents an image that shows contents of a phone screen (also referred to as a screenshot) at two different time moments. In this situation, the mobile device is exemplified by a mobile or cellular phone, or smartphone. At first, as shown in FIG. 1A, the notification list occupying the most part of the phone screen is empty (see "No notifications"), meaning that there are no new events occurred in the phone. The screenshot shown in FIG. 1A is also possible when the phone has just been switched on after a long break and is currently connecting to a cellular or mobile network and various applications to check whether there are any new events occurred during the switching-off period of the phone. In FIG. 1B, it is implied that the user has missed a phone call during the switching-off period of the phone, with the phone call being from a phone number not stored in a phone book. If the phone has a special phone number owner lookup application installed thereon, this lookup application will automatically search an online catalog for contact details of the owner of the phone number and provide a notification on the search results to the notification list. As follows from FIG. 1B, the lookup application could not also identify the owner of the phone number. As a result, the phone screen shows the notification list comprising two notifications on the same event, i.e. the missed call, from a mobile network operator and the lookup application, thereby unreasonably occupying a significant screen part.

Figure 1C:
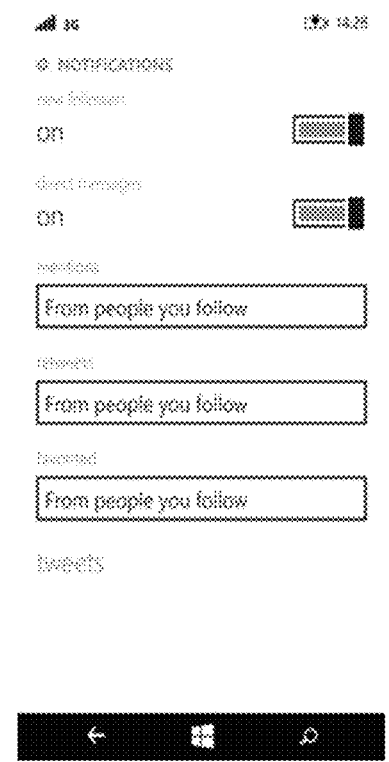
FIG. 1C illustrates another exemplary situation which may cause annoyance to the user.

FIG. 1C illustrates another exemplary situation which may make the user of the phone annoyed. Here it is implied that the notification list is flooded with notifications from a Twitter client for Windows Phone used as a mobile operating system in the phone. Each notification corresponds to a different event, such as a new tweet or retweet from people the user follow, a mention about unread tweets, etc. Again, if the phone is switched on after a long switching-off period, the notifications from the Twitter client will appear one by one during a short time period, thereby forming the multi-page notification list that is difficult to review and read (i.e. the user will be forced to scroll the notification list to find the most relevant notifications).

Furthermore, the event notifications (from the Twitter client or other mobile applications), when received in long bursts, consume more system resources, in particular battery power, and may cause the phone to sound notification beeps and ringing tones repeatedly and some at the same time, making the phone sound awkward, with continuous sounds and tones in response to the new notifications. With lots of incoming or pending notifications, the phone may slow down or even freeze, especially when tasks having a higher priority, such as a process for handling incoming phone calls, need to be activated. One more nuisance is that, when the user switches on the phone and, for example, starts typing a document or an email message, or is preparing to show a presentation to an audience by using the "Project my screen" feature, the continuous beeping and notification popups cause distraction from said typing or showing and may annoy the user greatly.

The present disclosure takes into account the above-mentioned drawbacks peculiar to the prior art and is directed to improving the efficiency of filtering the event notifications, thereby not annoying the user with the event notifications that are deemed unimportant to the user, while allowing the user to review the event notifications when he or she has free time.

Figure 2:
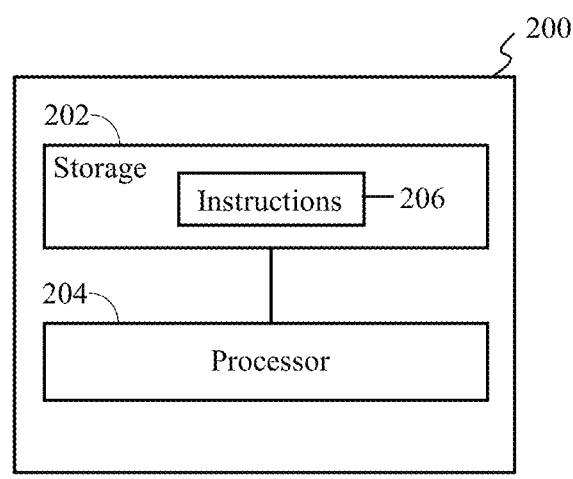
FIG. 2 illustrates a block-scheme of an apparatus for managing event notifications in a mobile device in accordance with the present disclosure.

FIG. 2 shows an exemplary block scheme of an apparatus 200 for managing event notifications in a mobile device in accordance with an aspect of the present disclosure. As shown in FIG. 2, the apparatus 200 comprises at least one storage 202 and at least one processor 204 coupled to the storage 202. The storage 202 stores processor executable instructions 206 to be executed by the processor 204 to filter the event notifications in a proper manner. To do this, the apparatus 200 may be part of the mobile device or implemented as a remote device, such as a remote server, which the mobile device connects to, once switched on.

The storage 202 may be implemented as a volatile or nonvolatile memory used in modern electronic computing machines. As an example, the nonvolatile memory may include Read-Only Memory (ROM), ferroelectric Random-Access Memory (RAM), Programmable ROM (PROM), Electrically Erasable PROM (EEPROM), solid state drive (SSD), flash memory, magnetic disk storage (such as hard drives and magnetic tapes), optical disc storage (such as CD, DVD and Blu-ray discs), etc. As for the volatile memory, examples thereof include Dynamic RAM, Synchronous DRAM (SDRAM), Double Data Rate SDRAM (DDR SDRAM), Static RAM, etc.

Relative to the processor 204, it may be implemented as a central processing unit (CPU), general-purpose processor, single-purpose processor, microcontroller, microprocessor, application specific integrated circuit (ASIC), field programmable gate array (FPGA), digital signal processor (DSP), complex programmable logic device, etc. It is worth noting that the processor 204 may be implemented as any combination of the aforesaid. As an example, the processor 204 may be a combination of two or more microprocessors.

The processor executable instructions 206 stored in the storage 202 may be configured as a computer executable code which causes the processor 204 to perform the aspects of the present disclosure. The computer executable code for carrying out operations or steps for the aspects of the present disclosure may be written in any combination of one or more programming languages, such as Java, C++ or the like. In some examples, the computer executable code may be in the form of a high-level language or in a pre-compiled form and be generated by an interpreter (also pre-stored in the storage 202) on the fly.

Being caused with the processor executable instructions 206, the processor 204 first obtains an event notification intended for display to a user and related to a new event occurred in the mobile device. After that, the processor 204 determines a notification context associated with the user of the mobile device and/or the mobile device for the event notification. Further, the processor 204 is instructed to predict a relevance degree for the event notification based on the event notification and the notification context by using a learning algorithm that takes into account past event notifications, associated past notification contexts and user reactions to the past event notifications. The learning algorithm may also take into account a reception time of the event notification and/or a time of user reaction to the past event notifications. Finally, the processor 204 decides whether to display the event notification to the user with the mobile device based on the predicted relevance degree.

Figure 3:
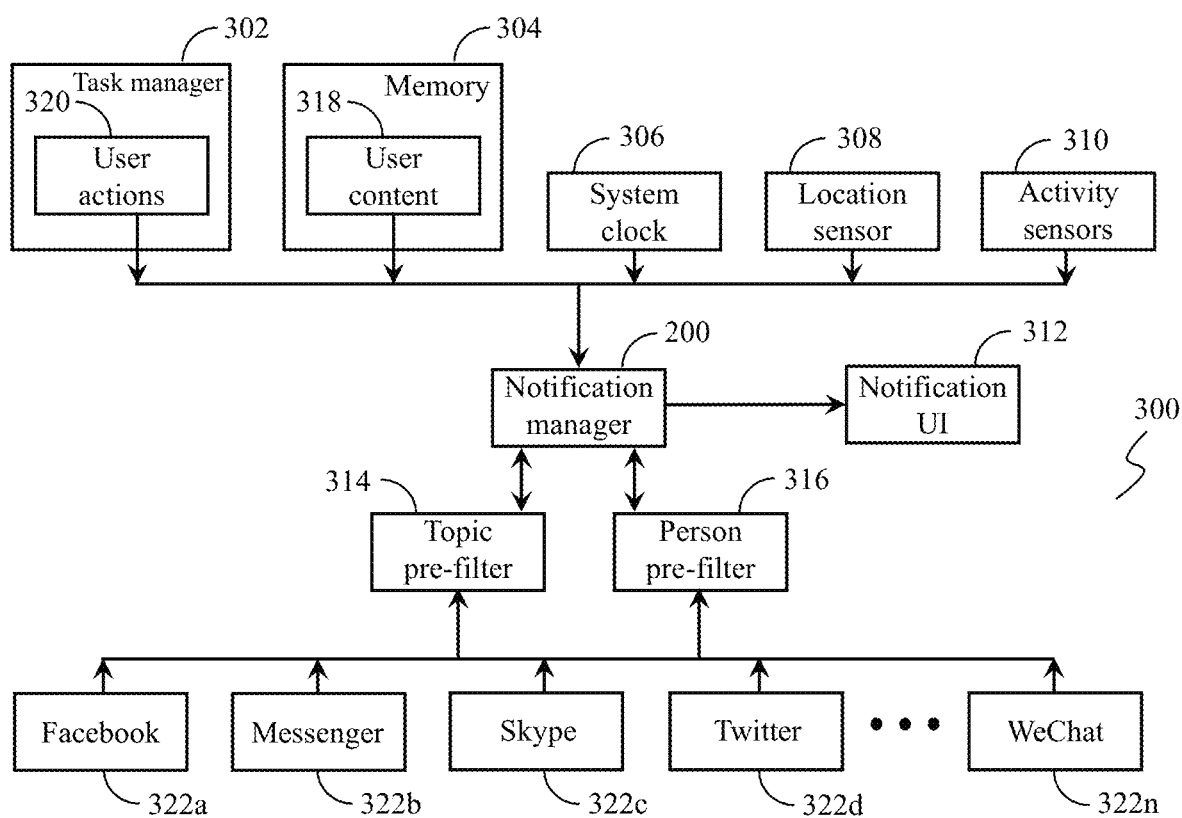
FIG. 3 shows an exemplary interaction environment for some hardware and software components of a mobile device and the apparatus of FIG. 2 in accordance with the present disclosure.

FIG. 3 illustrates an exemplary interaction environment 300 for some hardware and software components of the mobile device and the apparatus 200 (referred to as a notification manager for clarity) implemented as the part of the mobile device or the remote device, as discussed above. As can be seen, the hardware components involved in the interaction comprises a task manager 302, a memory 304, a system clock 306, a location sensor 308, activity sensors 310, a notification user interface (UI) 312, a topic pre-filter 314, and a person pre-filter 316. As for the software components, they are represented by mobile applications 322a-322n installed on the mobile device, such as Facebook, Messenger, Skype, Twitter, WeChat, etc. It should be apparent to those skilled in the art that the component arrangement and number shown in FIG. 3 are illustrative and may be modified in any proper manner, if required. The arrows having one and two arrowheads demonstrate the interaction between the hardware and software components and the apparatus 200. This interaction is performed as discussed below.

Assuming that at least one of the mobile applications 322a-322n produces an event notification, such, for example, as a new message received via Facebook, the apparatus 200 starts, upon receiving the event notification, determining the notification context for the event notification. In one embodiment, the notification context may comprise information about user activity, user content, user actions, sensor information from at least one sensor of the mobile device, application information, or any combination thereof. The user activity may be determined by using the activity sensors 310 and may include the following activities: walking, standing, sitting, running, sleeping, etc. In particular, the sleeping state of the user may be also determined by using the system clock 304, i.e. if it is nighttime, for example, it is most likely that the user is trying to fall asleep or has already fallen asleep. User content 318 represents different user data stored in the memory 304 of the mobile device, such as important and/or favorite texts, messages, audio and video records, etc. User actions 320 are determined by the task manager 302 allowing the apparatus 200 to be informed about all the processes currently run on the mobile device, and may include typing a new message, recoding a new audio or video file, showing a presentation to an audience by using the "Project my screen" feature, etc. The sensor information may per se encompass the user activity and additionally include output data from other sensors mounted in the mobile device, such as the location sensor 308 implemented as a satellite positioning system sensor in one example. In the interaction environment shown in FIG. 3, the sensor information includes location data from the location sensor 308. The application information may include different information about the mobile applications 322a-322n, such as a usage rate of each mobile application, a priority of each mobile application, one or more topics discussed with other people via each mobile application, etc. To collect the application information more efficiently, the topic pre-filter 314 and the person pre-filter 316 are used in cooperation with the apparatus 200. The topic pre-filter 314 and the person pre-filter 316 may be implemented as part of the apparatus 200 or as individual processors, such as a microprocessor, etc.

In one embodiment, the apparatus 200 may be further configured to convert the location data from the location sensor 308 to zone identifiers (IDs), with each zone identifier being indicative of a geographical zone within which the mobile device is located during the reception of the event notification. The zone IDs are coarser representation of places in the world, which is more reasonable and preferable to use because the apparatus 200 would overflow with location events if all coordinates with their decimal accuracy were stored in the memory 304 of the mobile device. Instead, the locations are quantized as zones that are, for example, circles each having a diameter of 100 meters, or other shapes like hexagons around the centre coordinate of the zone. Thus, the apparatus 200 takes, for example, the GPS coordinates and computes the zone ID which the current GPS coordinates belong to. In another embodiment, there is a different way to produce said zoning, which consists in presenting the Earth as a grid and computing a grid cell which the current location of the mobile device belongs to. Yet another embodiment provides said zoning by tracking most visited areas and collecting the number of visits to each area for a certain period of time, thereby forming a heat map allowing a centre for each new zone to be computed and subsequently used to generate an associated zone ID. As an example, the zone ID may have the following format: "zone://zonenumber", where "zonenumber" is either a unique identifier or hash or a number.

In one embodiment, the apparatus 200 may be further configured to encode the notification context for the event notification as a bag of words describing, for example, the combination of the sensor information, the user actions, the location data, the current time, etc. Then, the apparatus 200 may convert the bag of words to a sparse vector representation. The sparse vector representation comprises multiple sparse vectors each representative of one of the words constituting the bag of words. Each sparse vector is a one-dimensional array of elements comprising mostly zero values, as well known in the art. In particular, each word may be represented by an individual sparse vector comprising 10000 elements, among which randomly selected 20 elements are occupied, while the rest are zeroes. Out of these 20, one half are negative ones, i.e. "−1", while another half are positive ones, i.e. "+1". According to the Random Indexing theory, the likelihood of collisions for all the 20 randomly picked indexes in the space represented by 10000 elements are extremely slim, for which reason these randomly generated vectors can be summed together without ill-effects to save memory resources. One example of the shortened sparse vector (compared to that having 10000 elements) is as follows: "00000000000011000000001100000000000000010100 000001001", and its adding with one other sparse vector may be written as:

00000000000011000000001100000000000000001010 0000001001+
01000000000000000000000100000000000000000010 100000010001=01000000000011000000001200000 00000000000020200000011002

Each resulting sum vector may be stored in the memory 202 of the apparatus 200 in form of a data structure that does not contain the zeroes (i.e. as "1111222112" with regard to the example above). In one embodiment, such data structures are combined into a matrix. After that, one may make a mapping between the value of each sum vector and its index in the data structure, for example, similar to how this is done in C++.

Thus, the apparatus 200 may encode the notification context for each event notification as the sum vector described above and store the sum vector in the memory by assigning a certain index thereto. Later, the apparatus 200 may access to the memory 202 to retrieve therefrom the respective sum vector in case if a new event notification is accompanied by the same notification context as the previously stored. If the sum vector for the notification context is absent in the data structure stored in the memory 202, it should be included in the data structure as a new one.

Once the notification context is determined and processed in the above-described manner, the apparatus 200 proceeds to predicting a relevance degree for the event notification. In particular, said prediction may be performed based on the event notification itself and its notification context by using a machine learning algorithm. The machine learning algorithm may be implemented by using a neural network, a spiking neural network, a decision tree, random indexing etc. Furthermore, the machine learning algorithm may be either unsupervised or supervised in some embodiments. The former case allows for minimizing or even excluding user involvement from the operation of the machine learning algorithm. As noted above, the machine learning algorithm may take into account past event notifications, associated past notification contexts and user reactions to the past event notifications. All of these past data may be stored in advance in the memory 304 of the mobile device or in the memory 202 of the apparatus 200, depending on particular applications. The relevance degree predicted by the apparatus 200 may be expressed in percent and presented as any other numerical value. In one embodiment, the apparatus 200 may assign a threshold value to the relevance degree based on analysis of the past data indicated above. By doing so, the apparatus 200 may be configured to display an event notification to the user via the notification UI 312 if the relevance degree associated with the event notification exceeds the threshold or to prevent the event notification from displaying to the user if the relevance degree does not exceed the threshold.

In one embodiment, it is intended that the past notification context for each past event notification is pre-encoded by the apparatus 200 as the sparse vector representation discussed above. In this case, the apparatus 200 is configured to predict the relevance degree for the current event notification by comparing the sparse vector representation for the current event notification to the sparse vector representation for each past event notification by using a vector distance measure, such as a cosine distance or similarity. The apparatus 200 is then configured, based on the results of said comparison, to present the past event notification closest to the event notification, and obtain the relevance degree for the current event notification by taking into account the user reaction to the revealed past event notification.

In one embodiment, as already discussed, a user reaction to a past event notification associated with a past notification context may be taken into account when determining whether to display a new event notification to the user with the mobile device. More specifically, the time of user reaction, for example, opening or dismissing a past event notification may be used as a key for determining whether something is or is not important at that time rather than an arrival time of the event notification.

Figure 4:
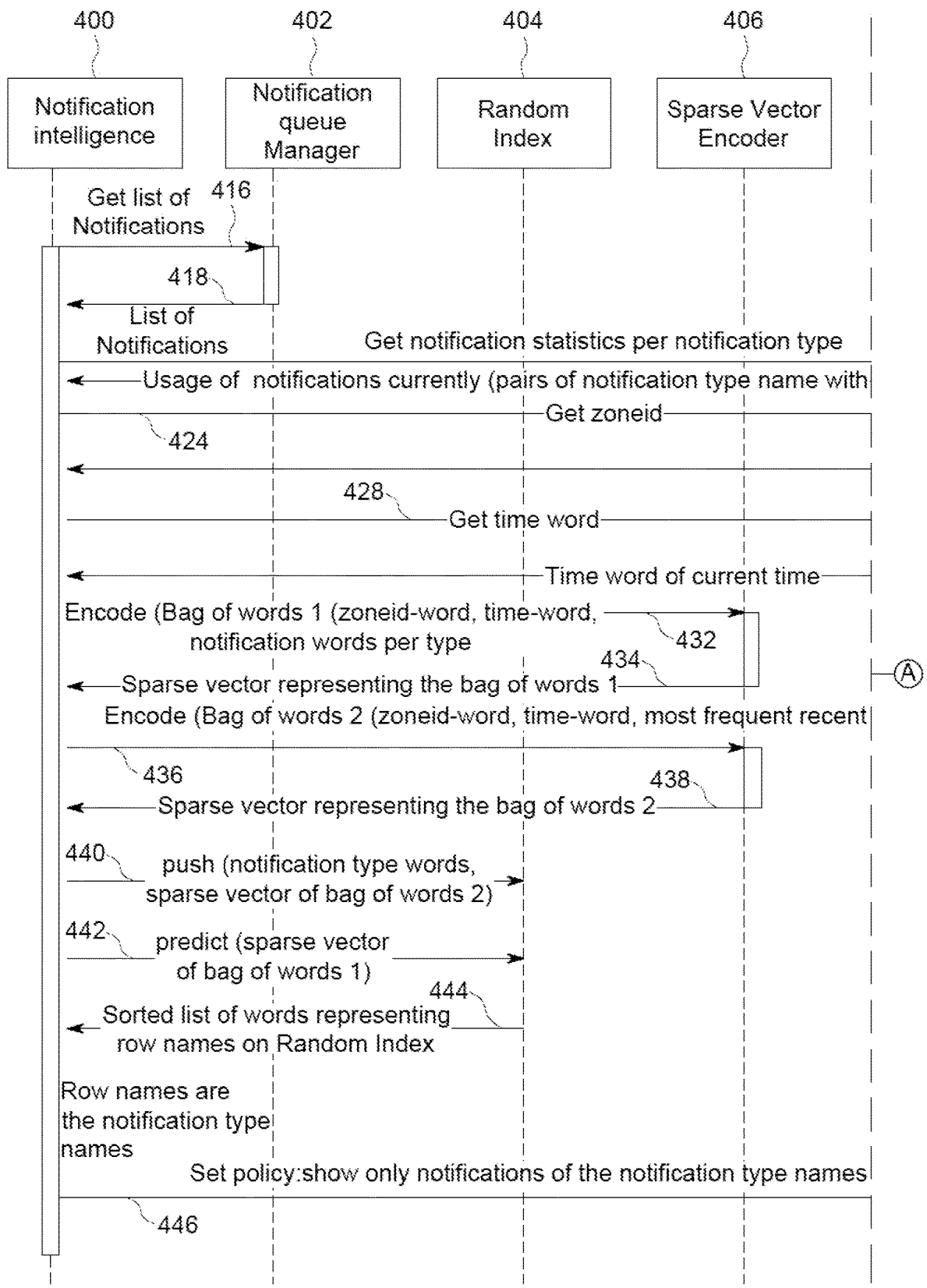
FIG. 4 shows a workflow diagram demonstrating the operation of the apparatus of FIG. 2 in accordance with the present disclosure.
Figure 4:
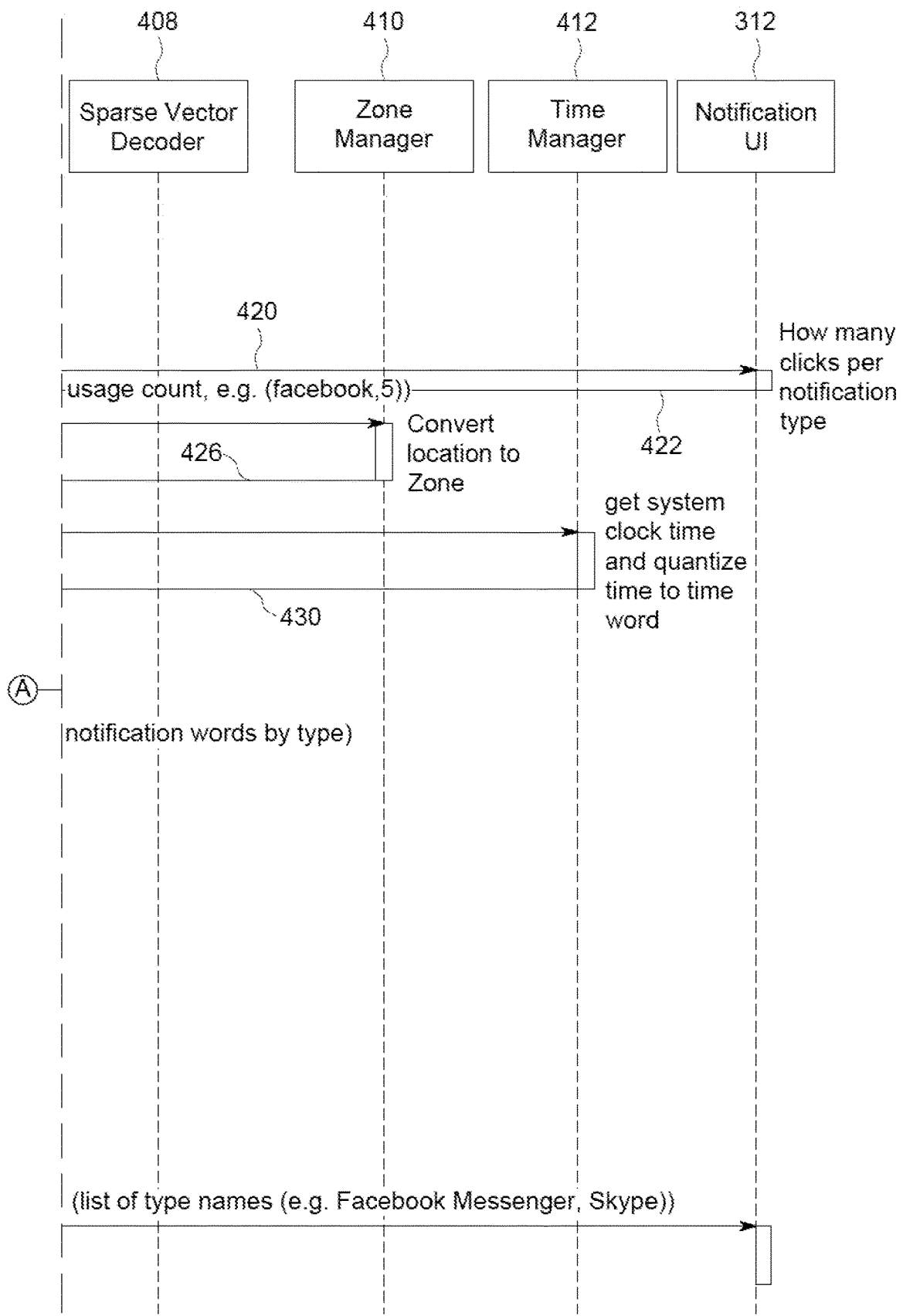

The embodiment above is illustrated as a workflow diagram in FIG. 4, in which functional units 400, 404-412 may be implemented as individual microprocessors constituting together the processor 204 of the apparatus 200, while a functional unit 402, i.e. a notification queue manager, may be implemented as one hardware or software component of the mobile device. Of course, in other embodiments, the functional units 400, 404-412 may be all integrated into a single microprocessor or any other exemplary implementation of the processor 204, as discussed above with reference to FIG. 2.

As shown in FIG. 4, the workflow diagram starts with a notification intelligence 400 sending 416 a request for a list of available event notifications to the notification queue manager 402 of the mobile device. In response to the request, the notification queue manager 402 of the mobile device provides 418 the list of the event notifications to the notification intelligence 400. After that, the notification intelligence 400 starts determining the notification context for each event notification by sending 420 a request for notification statistics to the notification UI 312. The notification statistics may include, for example, the number of clicks the user has made in respect of each event notification. The notification statistics may further indicate how the user reacts to different types of the event notifications at the time of reception thereof: ignore, dismiss, open the mobile applications relating to the event notifications, etc. Such or similar notification statistics is collected and stored in the notification UI 312. Once the notification statistics is prepared, the notification UI 312 then provides 422 it to the notification intelligence 400.

Next, the notification intelligence 400 continues determining the notification context for each event notification by obtaining the zone ID for the location of the mobile device at the time of reception of the event notifications. This involves sending 424, by the notification intelligence 400, a request for the zone ID to a zone manager 410 configured to receive the location data, such as GPS coordinates, from the location sensor 308 and convert them to the respective zone ID, as discussed above. Once the zone ID is received 426 from the zone manager 410, the notification intelligence 400 further requests 428 a time manager 412 to submit a time word, which is one of those words included in the above-mentioned bag of words. The time manager 412 receives time data from the system clock 306 of the mobile device, converts the time data to the time word, and sends 430 the time word to the notification intelligence 400. After that, it is intended in this embodiment that the notification intelligence 400 finishes determining the notification context, i.e. the bag of words, for each event notification from the notification list. However, in some embodiments, the notification intelligence 400 may continue collecting any other information suitable to be regarded as the notification context, so that the zone ID, the time word, and the notification statistics mentioned above should not be construed as any limitation to the present disclosure. As an example, it is possible to include just the zone ID and the time word in the bag of words, or the bag of words may alternatively be presented as the combination of the zone ID+the time word+the activity word (indicative, for example, of walking, standing, etc.). The bag of words may also contain plain words extracted from the user content, for example from user chat messages. The above-given examples of the bag of words are optional and not necessarily required to do the prediction of the relevance degrees of the event notifications, but they are helpful for increasing the accuracy of the prediction.

In one example in which the user is assumed to be chatting with his or her friend about launching SpaceX BFR (which is a big falcon rocket), the processor 204 (for example, the notification intelligence 400) of the apparatus 200 may extract the words "SpaceX", "BFR" and "rocket" from the discussion as keywords. Now, it is further assumed that the notification intelligence 400 obtains new event notifications concerning Facebook events and waiting to be shown on the notification UI 312, and extracts their content, such as the keywords. If the extracted keywords of some of the event notifications match those from the discussion, the notification intelligence 400 is then able to filter the new event notifications not only based on the notification types, but also based on the user content. In other words, the bag of words may include the user content too.

Referring back to FIG. 4, the notification intelligence 400 sends 432 the notification context for each event notification in the form of the bag of words to a sparse vector encoder 406. The sparse vector encoder 406 is configured to encode the bag of words as the sparse vector representation, meaning that each word of the bag of words is encoded as the individual sparse vector. As noted above, the bag of words for each event notification may include different words describing the location, time, user content, user activity, etc. As an example, the workflow diagrams involve sending 432, 436 two different bags of words 1, 2, respectively, from the notification intelligence 400 to the sparse vector encoder 406, and, in response, receiving 434, 438 two respective sparse vector representations from the sparse vector encode 406. However, it should be apparent to those skilled in the art that the number of such bags of words as well as their content may vary depending on particular applications. The notification intelligence 400 receives the sparse vector representations for the event notifications, converts them to the sum vectors as discussed above (i.e. by adding all the sparse vectors in each sparse vector representation), and stores the sum vectors in the memory 202 of the apparatus 200, for example, as a matrix data structure that does not contain zeroes.

When a new event notification is added to the notification queue, the above-mentioned operations involving collecting the notification context may be repeated to result in the sum vector for the new event notification. After that, the notification intelligence 400 checks whether the sum vector for the new event notification is already contained in the matrix data structure. If this is not the case, the notification intelligence 400 then causes a random index engine 404 to push or add 440 this sum vector to the matrix data structure, while assigning a matrix index thereto. At the same time, the notification intelligence 400 may predict 442 the relevance degree for the new event notification by causing the random index engine 404 to compare the sum vector for the new event notification to the sum vector for each past event notification by using a vector distance measure, such as the cosine distance or similarity. To do this comparing, the random index engine 404 uses the Random Indexing algorithm, which is explained in detail by M. Sahlgren in the paper "An Introduction to Random Indexing", in: Methods and Applications of Semantic Indexing Workshop at the 7th International Conference on Terminology and Knowledge Engineering, 16 Aug. 2005, Copenhagen, Denmark. The results of said comparing, i.e., the past event notification closest to the new event notification and the user reaction thereto (which is per se retrieved from the respective bag of words), are then provided 444 to the notification intelligence 400. Next, the notification intelligence 400 obtains the relevance degree for the new event notification by taking into account the user reaction to the presented past event notification. Finally, the notification intelligence decides 446, based on the relevance degree, whether to display the new notification to the user. It should be noted that if the decision not to display is made by the notification intelligence 400, this does not mean that the event notification is deleted or discarded; such an event notification may be, for example, hidden in the notification list (i.e., the user should, for example, press the "see more" button to see it) or shown to the user later when he or she has free time.

A sparse vector decoder 408 may be required if the sparse vector representations need to be translated back to words (which in turn describe the notification types). As an example, let's assume that a sparse vector is as follows:
0000001100000000000000000000000100000000000001
000000000000100000000000000
010000011100000000000000000000000000001
The notification type in this example is "notificationType:// facebook".

The sparse vector decoder 408 may work in two ways. It can either compare to exact match to a vector representation of a word (by simply comparing the allocated indexes out of the zeros), or compare to near match to a vector representation of a word (with cosine similarity or similar distance measure).

Figure 5:
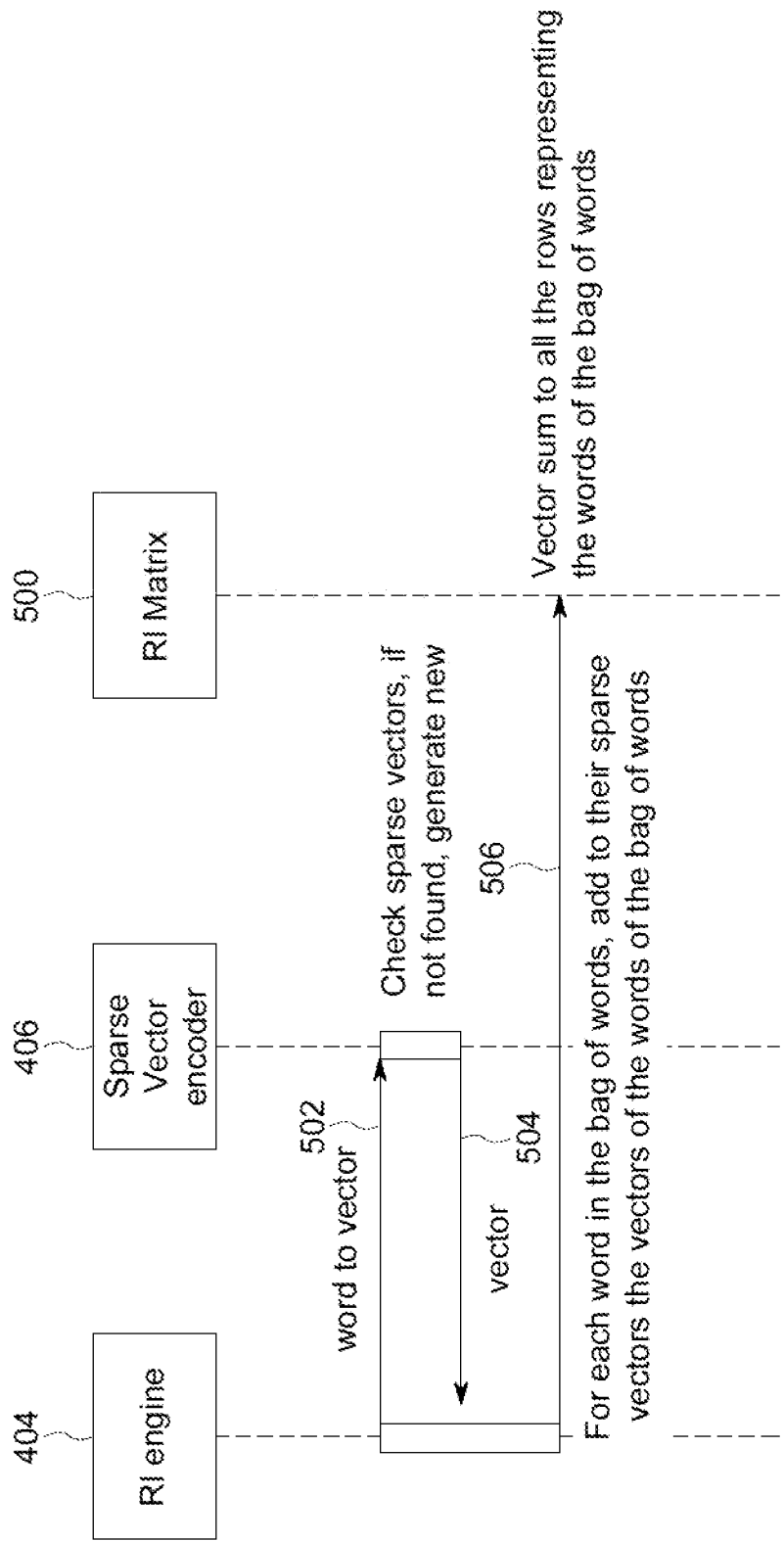
FIG. 5 illustrates a pushing operation performed by a random index engine in accordance with the present disclosure.

FIG. 5 illustrates the pushing operation 440 performed by the random index engine 404 in more detail in accordance with one exemplary embodiment. In particular, it is intended that the random index engine 404 receives the bag of words for a given event notification like those discussed above. After that, the random index engine 404 requests 502 the sparse vector encoder 406 to convert each word of the bag of words to the sparse vector. This request may be initiated by the notification intelligence 400 and sent via the random index engine 404 to the sparse vector encoder 406. The sparse vector encoder 406 obtains the sparse vector for each word of the bag of words, whereupon the sparse vector encoder 406 checks whether the same or similar sparse vector is already contained in the matrix data structure stored in the memory 202 of the apparatus 200, which is shown in FIG. 5 as a random index matrix 500. If this is not the case, the sparse vector currently obtained for the word of the bag of words is sent 504 to the random index engine 404. The same operations are repeated for the other words of the bag of words. The sparse vector is a stored representation for a word (which in turn describes a notification type). The representation for the same word can be recalled from the storage of sparse vectors, resulting that the same word always has the same representation. This could be also accomplished without the storage by having a hashing algorithm that produces the sparse vector without storing its string representation to a table or similar data structure. The random index engine 404 eventually obtains the sum vector for the bag of words and adds 506 it to the random index matrix 500.

Figure 6:
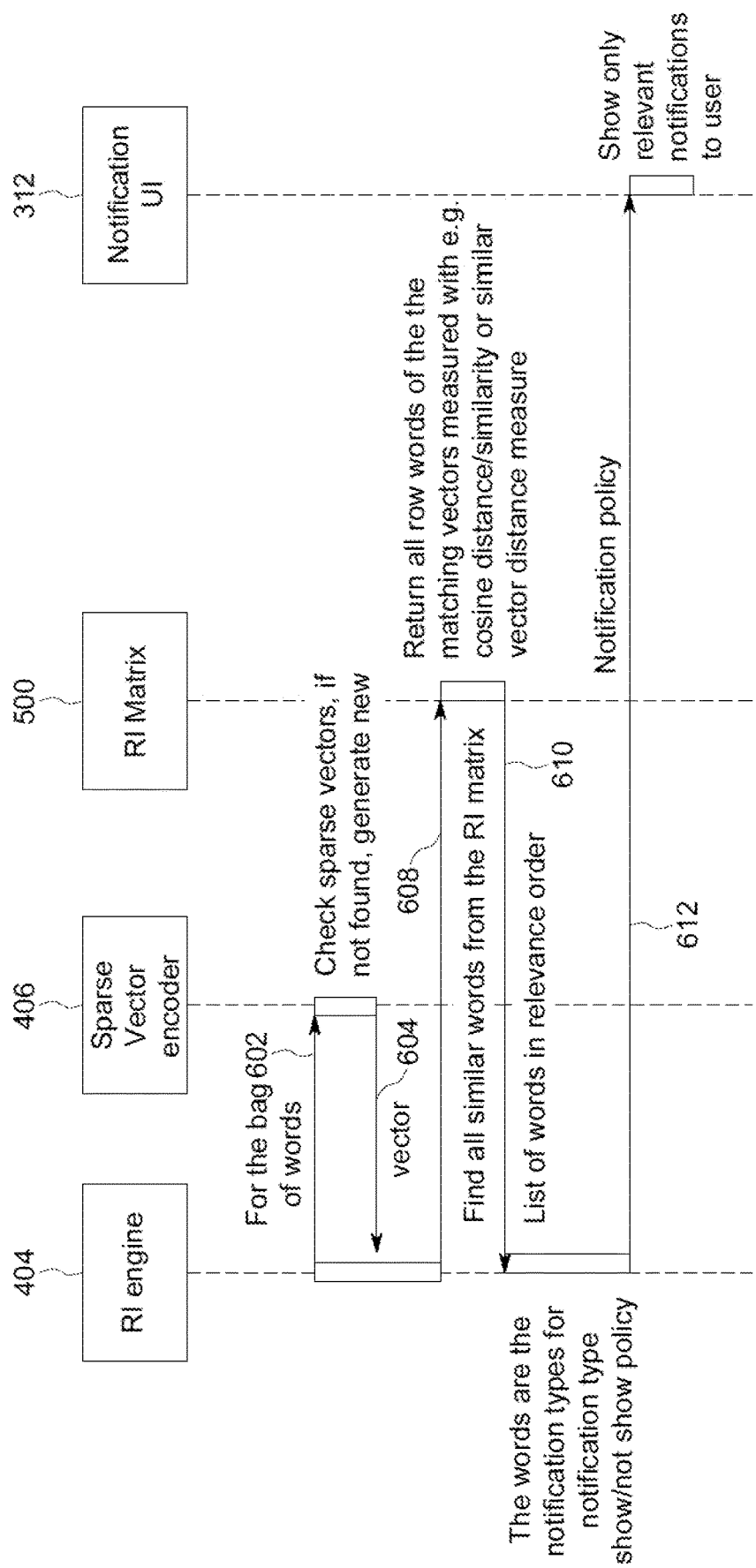
FIG. 6 illustrates a predicting operation performed by using a Random Indexing algorithm in accordance with the present disclosure.

FIG. 6 illustrates the predicting operation 442 performed by using the Random Indexing algorithm in more detail in accordance with one exemplary embodiment. As shown in FIG. 6, the random index engine 404 sends 602 the bag of words for a new event notification to the sparse vector encoder 406, and the sparse vector encoder 406 converts the bag of words to the sparse vector representation, as discussed above. After that, the sparse vector encoder 406 checks whether there is the same sparse vector representation in the random index matrix 500. If this is not the case, the sparse vector encoder 406 sends 604 the sparse vector representation for the bag of words to the random index engine 404. Next, the random index engine 404 finds 608 the closest or similar sparse vector representations (or, in other words, the closest or similar bags of words) for one or more of the past event notifications in the random index matrix 500, for example, by using the cosine distance or similarity, and retrieves 610 a list of similar words in a relevance order.

By using the list of similar words, the random index engine 404 determines 612 a notification policy for the new event notification, i.e. decides whether to display it to the user or not.

Figure 7:
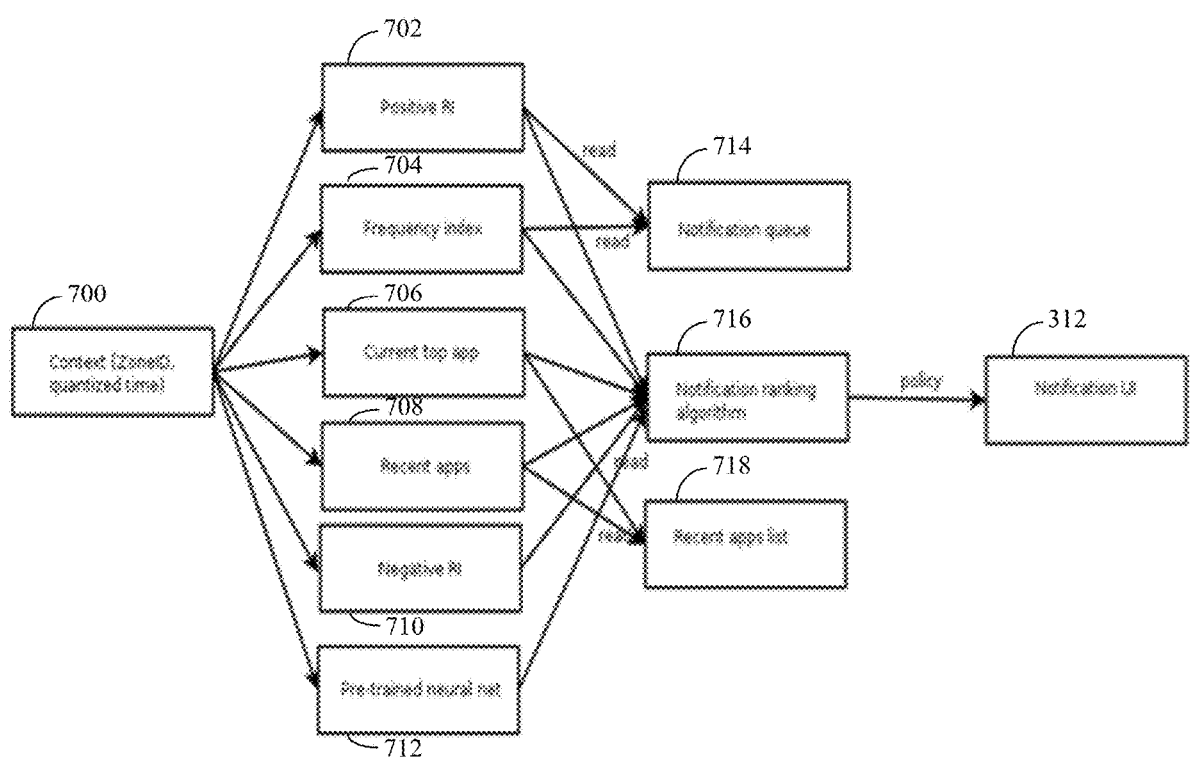
FIG. 7 illustrates an example of using a combined solution in a notification type ranking algorithm in accordance with the present disclosure.

FIG. 7 illustrates an example of using a combined solution in a notification type ranking algorithm in accordance with the present disclosure. It should be noted that the random indexing algorithm used by the random index engine 404 alone serves only for the spatial context-based prediction of the relevance degree. This means that the location, time, etc. are bound to the notification type. In many cases, user behaviour is not completely predictable based on the spatial context. Instead, it is partly random. To predict such randomly occurring events, a frequency-based algorithm is the best fit. It is therefore desirable to predict the relevance degree of the event notification in the following way (with reference to FIG. 7):

1) It is detected that the prediction based on the spatial context 700 is likely random. This can be noticed by inspecting the saturation of the sparse vectors representing the notification type. The saturation means that the sparse vector becomes dense. The sparse vector has zeroes between non-zero values. The sparse vector is no longer sparse when it is saturated, meaning that there are no zeroes between the non-zero values. An example of a saturated sparse vector can be 11111111111111111111111111111111111111111111 11111111111111111111 11111111111111111111111111111111111111111111 111111111 (could be any non-zero values, but in this example for simplicity using 1). When the sparse vector is saturated, the noise rises up and the sparse representations is not differentiable any more. When the sparse vector is very saturated, the best way to predict the notification type, i.e. its relevance degree, is its usage frequency. The usage frequency can be obtained from a frequency index predictor 704 that counts the usage frequency per each notification type, for example, by accessing a notification queue 714.

2) A currently used mobile application ("current top app" 706) is also a good predictor that the event notifications related to that application needs to be prioritised.

3) Recently used applications 708 combined in a recent application list 718 are a good indicator also for that event notifications related to that application needs to be prioritised because they were recently in the centre of interest.

4) The resulting predicted notification type hence becomes a combination from the positive random index engine 702, the frequency index predictor 704, the prevailing notification context 706, and the recent notification context 708. FIG. 7 shows that a notification type ranking algorithm 716 receives input from these blocks and perform a ranking procedure to calculate the resulting predicted notification type. In one embodiment, in calculating the resulting predicted notification type by the notification type ranking algorithm 716, the weight on the prevailing 706 and recent 708 notification context are the highest, and the frequency 704 and the positive random index predictor 702 will have lower weights. The notification type ranking algorithm 716 may be implemented using any appropriate algorithm or determination process based on the inputs it receives, and the weighing example illustrated herein is only one possible implementation.

5) The notification type ranking algorithm 716 can be further improved by utilising a pre-trained deep neural network 712. This pre-trained neural network 712 may be trained with a large amount of user data to classify a likely notification types from the words. This is a model for an average user and may not be as accurate as the random index engine 404. However, the random index engine 404 takes some days of usage before the predictions are good, and in the beginning the pre-trained classifications can be used and the weight is gradually shifted to the random index and frequency when the whole system learns from user habits.

6) One additional way to improve the accuracy is a negative random index predictor 710. This can be accomplished, for example, with the random indexing in the following way:
   a. Those notifications the user does not ever select (requires long time of inattention) will be learned as an irrelevant type.
   b. The irrelevant type is strengthened for notification types the user is never interested in.
   c. When the user selects these event notifications, their irrelevancy is decreased until they are taken out of the negative random index predictor 710.
   d. The negative random index predictor 710 works like the normal random index engine 404, but instead of predicting something, it is configured to predict the least likely candidates.
   e. When the user deletes or dismisses the event notifications always on some notification type, these may be added to the negative random index 710. Then, the negative random index predictor 708 will start predicting against these event notifications.

7) The negative random index predictor 708 may furthermore be combined with the random index engine 404.

To explain the notification type ranking algorithm 716 with an example, weights W1, W2, W3, W4, W5 and W6 are taken as respective weights for the different ranking algorithms. For example, the weights may be selected as follows:
W1=0.20
W2=0.20
W3=0.25
W4=0.25
W5=−0.25
W6=0.1

The weights are not necessarily fixed, and they can be conditionally changing. One such weight change event may be the beginning of usage of the apparatus 200, where the random index and frequency algorithms have not learned enough events from the actual user data and the weight of a pre-trained classifier is higher, until the ransom index and frequency algorithms learn the user's habits. This change may be adjusted per product, but one possibility is to keep some period of time, for example, one week as "training period" for learning the user's habits. The weight of the pre-trained classifier may gradually decrease during this period while the random index and frequency algorithms improve as the data comes available to them.

Let's consider a use case as an example. The positive random index engine 702 predicts the following weights: Facebook messenger 0.9, Facebook groups/Savannah cat lover 0.8, Facebook groups/Serval cat lover 0.6, Google groups 0.6. The frequency index predictor 702 predicts the following weights: Facebook messenger 0.9, Facebook groups/Savannah cat lover 0.4, Facebook groups/Serval cat lover 0.5. The prevailing top application: Facebook messenger. The recent applications: Facebook messenger, Calculator, Browser. The negative random index predictor 708 gives the following: Google groups.

Now, the question to consider may, for example, be: "Should the Facebook messenger notification be shown on the notification list of the mobile device"? In the following, the weight 0.20 is used for the positive random index 702, the weight 0.20 is used for the frequency index 704, the weight 0.25 is used for the current top application 706, the weight 0.25 is used for the recent applications 708, the weight −0.25 is used for the negative random indexing 710 and the weight 0.10 is used for the pre-trained neural network 712. By applying the weights, the following is given:

0.20*0.9=0.18 (positive random indexing 702)
0.20*0.9=0.18 (frequency index 704)
0.25*1.0=0.25 (the current top application 706=same=1.0)
0.25*1.0=0.25 (the recent applications contain the Messenger application=1.0)
−0.25*0.0=0.0 (negative random index does not predict against Messenger)
0.1*0.2=0.02 (the pre-trained neural network 712)

The end result is thus 0.18+0.18+0.25+0.28+0+0.02=0.91. This means that the Messenger application is added to a notification policy that is further sent to the notification UI 312 that will utilise it to arrange its views.

Figure 8:
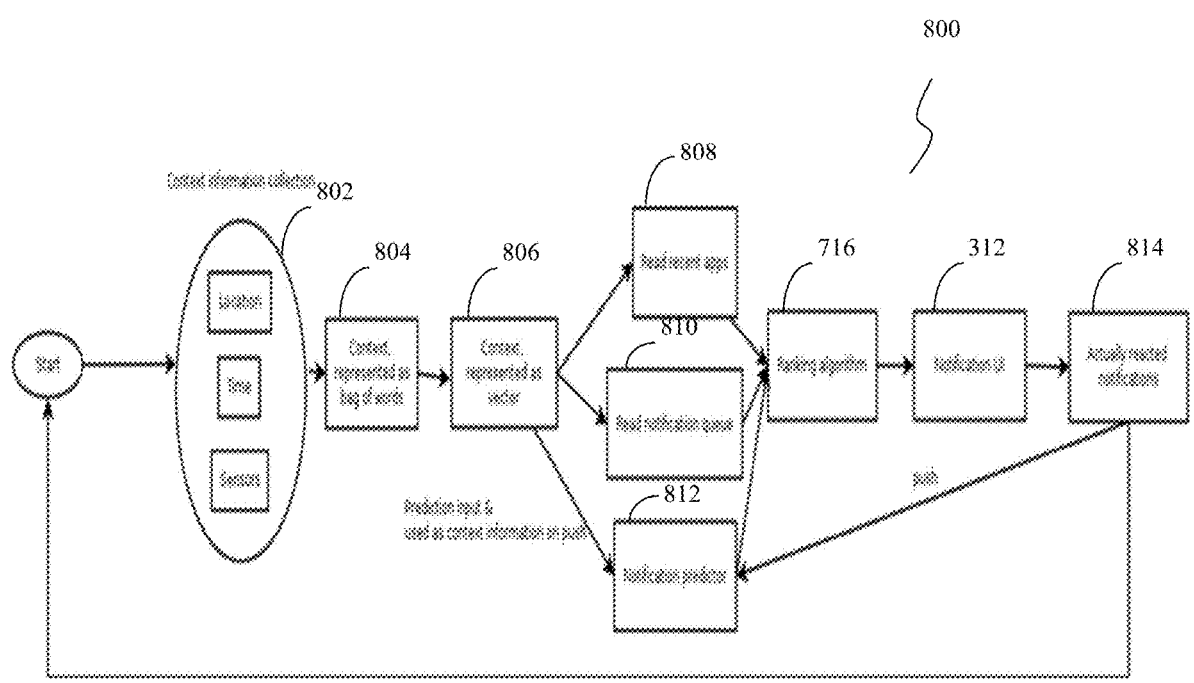
FIG. 8 illustrates an exemplary operating cycle of the notification context-based prediction of the relevance degree for the event notification in accordance with the present disclosure.

FIG. 8 shows an exemplary operating cycle 800 of the notification context-based prediction of the relevance degree for the event notification. The cycle 800 may be performed by the apparatus 200 and starts with collecting 802 the notification context. This may be done as discussed above, and the notification context may include the location of the mobile device, the time of receipt of the event notification, the sensory information, etc. After that, the notification context is encoded 804 as the bag of words, which is then converted 806 to the sparse vector representation. Using information from at least one notification predictor 812 (for example, positive random index 702, frequency index 714 etc. discussed in relation to FIG. 7), notifications comprised in a notification queue 810 and recent applications 808, the notification ranking algorithm 716 is able to output the resulting predicted notification type. Based on the result from the notification ranking algorithm 716, it is decided to display an event notification to the user via the notification UI 312 if the relevance degree associated with the event notification exceeds the threshold or to decide to prevent the event notification from being displayed to the user if the relevance degree does not to exceed the threshold. Knowledge about the notifications 814 users actually reacted to is again used as an input at the notification predictor 812.

Those skilled in the art should understand that each step or operation, or any combinations of the steps or operation mentioned above, can be implemented by various means, such as hardware, firmware, and/or software. As an example, one or more of the steps or operation described above can be embodied by computer or processor executable instructions, data structures, program modules, and other suitable data representations. Furthermore, the computer executable instructions which embody the steps or operation described above can be stored on a corresponding data carrier and executed by at least one processor like the processor 204 included in the apparatus 200. This data carrier can be implemented as any computer-readable storage medium configured to be readable by said at least one processor to execute the computer executable instructions. Such computer-readable storage media can include both volatile and nonvolatile media, removable and non-removable media. By way of example, and not limitation, the computer-readable media comprise media implemented in any method or technology suitable for storing information. In more detail, the practical examples of the computer-readable media include, but are not limited to information-delivery media, RAM, ROM, EEPROM, flash memory or other memory technology, CD-ROM, digital versatile discs (DVD), holographic media or other optical disc storage, magnetic tape, magnetic cassettes, magnetic disk storage, and other magnetic storage devices.

Although the exemplary embodiments of the present invention are disclosed herein, it should be noted that any various changes and modifications could be made in the embodiments of the present invention, without departing from the scope of legal protection which is defined by the appended claims. In the appended claims, the mention of elements in a singular form does not exclude the presence of the plurality of such elements, if not explicitly stated otherwise.

The invention claimed is:

1. A method for managing event notifications in a mobile device, the method comprising:
   obtaining an event notification intended for display to a user and relating to a new event occurred in the mobile device;
   determining a notification context associated with the user of the mobile device or the mobile device for the event notification;
   predicting a relevance degree for the event notification based on the event notification and the notification context by using a learning algorithm, wherein the learning algorithm takes into account past event notifications, associated past notification contexts, calculated distances between the past event notifications and the event notification, and user reactions to the past event notifications; and
   deciding whether to display the event notification based on the predicted relevance degree.

2. The method of claim 1, wherein the notification context comprises information about user activity, user content, sensor information from at least one sensor of the mobile device, application information or a zone identifier, the zone identifier being indicative of a geographical zone within which the mobile device is located.

3. The method of claim 2, wherein the geographical zone is defined based on satellite positioning system coordinates received from a location sensor used in the mobile device.

4. The method of claim 1, wherein the learning algorithm is an unsupervised machine learning algorithm.

5. The method of claim 1, wherein the learning algorithm is implemented by using a neural network, a decision tree or random indexing.

6. The method of claim 1, wherein said deciding whether to display the event notification comprises, when the predicted relevance degree exceeds a predetermined threshold, deciding to display the event notification to the user, and preventing the event notification from being displayed to the user when the predicted relevance degree does not exceed the predetermined threshold.

7. The method of claim 1, wherein the past notification context for each past event notification is pre-encoded as a sparse vector representation, and wherein said predicting of the relevance degree comprises:
   encoding the notification context of the event notification as the sparse vector representation,
   comparing the sparse vector representation for the event notification to the sparse vector representation for each past event notification by using a vector distance measure as the calculated distance between each past event notification and the event notification,
   based on the results of said comparing, presenting a past event notification closest to the event notification, and
   obtaining the predicted relevance degree for the event notification by taking into account the user reaction to the presented past event notification.

8. The method of claim 7, wherein said comparing is performed by using a random indexing algorithm.

9. The method of claim 1, wherein the new event is a receipt of one of the following: a message in a social network, an email message, an SMS message, an application message, an incoming call, an alarm-clock signal, and a calendar event.

10. An apparatus for managing event notifications in a mobile device, the apparatus comprising:
    at least one processor, and
    a memory coupled to the at least one processor and storing processor executable instructions that, when executed by the at least one processor, cause the at least one processor to:
    obtain an event notification intended for display to a user and relating to a new event occurred in the mobile device,
    determine a notification context associated with the user of the mobile device or the mobile device for the event notification;
    predict a relevance degree for the event notification based on the event notification and the notification context by using a learning algorithm, wherein the learning algorithm takes into account past event notifications, associated past notification contexts, calculated distances between the past event notifications and the event notification, and user reactions to the past event notifications; and
    decide whether to display the event notification to the user of the mobile device based on the predicted relevance degree.

11. The apparatus of claim 10, wherein the notification context comprises information about user activity, user content, sensor information from at least one sensor of the mobile device, application information or a zone identifier, the zone identifier being indicative of a geographical zone within which the mobile device is located.

12. The apparatus of claim 11, wherein the geographical zone is defined based on satellite positioning system coordinates received from a location sensor used in the mobile device.

13. The apparatus of claim 10, wherein the learning algorithm is an unsupervised machine learning algorithm.

14. The apparatus of claim 10, wherein the at least one processor is configured to implement the learning algorithm by using a neural network, a decision tree or random indexing.

15. The apparatus of claim 10, wherein the processor executable instructions further cause the at least one processor to, when the predicted relevance degree exceeds a predetermined threshold, decide to display the event notification to the user, and prevent the event notification from being displayed to the user when the predicted relevance degree does not exceed the predetermined threshold.

16. The apparatus of claim 10, wherein a past notification context for each past event notification is pre-encoded as a sparse vector representation, and wherein the processor executable instructions further cause the at least one processor to predict the relevance degree by:

encoding the notification context of the event notification as the sparse vector representation, comparing the sparse vector representation for the event notification to the sparse vector representation for each past event notification by using a vector distance measure as the calculated distance between each past event notification and the event notification, based on the results of said comparing, revealing the past event notification closest to the event notification, and obtaining the predicted relevance degree for the event notification by taking into account the user reaction to the revealed past event notification.

17. The apparatus of claim 16, wherein the processor executable instructions further cause the at least one processor to perform said comparing by using a random indexing algorithm.

18. A non-transitory computer readable storage medium, storing a computer program, which, when executed by at least one processor, causes the at least one processor to perform obtaining an event notification intended for display to a user and relating to a new event occurred in the mobile device, determining a notification context associated with the user of the mobile device or the mobile device for the event notification;

predicting a relevance degree for the event notification based on the event notification and the notification context by using a learning algorithm, wherein the learning algorithm takes into account past event notifications, associated past notification contexts, calculated distances between each of the past event notifications and the event notification, and user reactions to the past event notifications; and deciding whether to display the event notification to the user of the mobile device based on the predicted relevance degree.

19. The non-transitory computer readable storage medium of claim 18, wherein the notification context comprises information about user activity, user content, sensor information from at least one sensor of the mobile device, application information or a zone identifier, the zone identifier being indicative of a geographical zone within which the mobile device is located.

20. The non-transitory computer readable storage medium of claim 18, wherein the geographical zone is defined based on satellite positioning system coordinates received from a location sensor used in the mobile device.

* * * * *